(12) United States Patent
Zhao et al.

(10) Patent No.: US 8,665,278 B2
(45) Date of Patent: Mar. 4, 2014

(54) MULTI-LAYERED SLIDE TRANSITIONS

(71) Applicant: Microsoft Corporation, Redmond, WA (US)

(72) Inventors: Jason Zhao, San Jose, CA (US); Mark Pearson, Renton, WA (US); Peter Lai, Mountain View, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/684,458

(22) Filed: Nov. 23, 2012

(65) Prior Publication Data
US 2013/0076759 A1      Mar. 28, 2013

Related U.S. Application Data

(63) Continuation of application No. 12/104,422, filed on Apr. 16, 2008, now Pat. No. 8,339,403.

(51) Int. Cl.
*G06T 15/00* (2011.01)

(52) U.S. Cl.
USPC ........... 345/473; 345/474; 345/475; 715/716; 715/753; 715/762; 715/771; 715/781

(58) Field of Classification Search
USPC .......... 345/473, 474, 475; 715/716, 753, 762, 715/771, 781
See application file for complete search history.

(56) References Cited

U.S. PATENT DOCUMENTS

| | | |
|---|---|---|
| 6,396,500 B1 | 5/2002 | Qureshi et al. |
| 6,601,057 B1 | 7/2003 | Underwood et al. |
| 6,694,353 B2 | 2/2004 | Sommerer |
| 6,976,028 B2 | 12/2005 | Fenton et al. |
| 7,102,643 B2 | 9/2006 | Moore et al. |
| 7,246,316 B2 | 7/2007 | Furlong et al. |
| 7,673,251 B1 | 3/2010 | Wibisono |
| 7,870,497 B2 | 1/2011 | Greer et al. |

(Continued)

FOREIGN PATENT DOCUMENTS

| | | |
|---|---|---|
| JP | 07210700 A | 8/1995 |
| JP | 2000194871 A | 7/2000 |

(Continued)

OTHER PUBLICATIONS

CodeJam, MemoriesOnTV User Guide, 2007, pp. 1-43.*

(Continued)

*Primary Examiner* — Phu K Nguyen
(74) *Attorney, Agent, or Firm* — Jim Ross; Leonard Smith; Micky Minhas (57) ABSTRACT

Architecture that enhances the visual experience of a slide presentation by animating slide content as "actors" in the same background "scene". This is provided by multi-layered transitions between slides, where a slide is first separated into "layers" (e.g., with a level of transparency). Each layer can then be transitioned independently. All layers are composited together to accomplish the end effect. The layers can comprise one or more content layers, and a background layer. The background layer can further be separated into a background graphics layer and a background fill layer. The transition phase can include a transition effect such as a fade, a wipe, a dissolve effect, and other desired effects. To provide the continuity and uniformity of presentation the content on the same background scene, a transition effect is not applied to the background layer.

20 Claims, 9 Drawing Sheets

(56) References Cited

U.S. PATENT DOCUMENTS

| | | |
|---|---|---|
| 2003/0090506 A1 | 5/2003 | Moore et al. |
| 2004/0071453 A1 | 4/2004 | Valderas |
| 2005/0216431 A1 | 9/2005 | Baker et al. |
| 2006/0037054 A1 | 2/2006 | McDowell et al. |
| 2006/0067578 A1 | 3/2006 | Fuse |
| 2007/0028172 A1 | 2/2007 | Greer et al. |
| 2007/0058207 A1 | 3/2007 | Asai et al. |
| 2007/0182999 A1 | 8/2007 | Anthony et al. |
| 2007/0226625 A1 | 9/2007 | Cardone et al. |
| 2007/0260683 A1 | 11/2007 | Hintermeister et al. |

FOREIGN PATENT DOCUMENTS

| | | |
|---|---|---|
| JP | 2001229391 A | 8/2001 |
| JP | 2005192028 A | 7/2005 |
| JP | 2005539336 A | 12/2005 |
| JP | 2007129717 A | 5/2007 |
| JP | 2007251780 A | 9/2007 |
| JP | 2007306426 A | 11/2007 |
| JP | 2008017171 A | 1/2008 |
| JP | 2008537232 A | 9/2008 |

OTHER PUBLICATIONS

"Advanced Slide Show Software Version 3.1", May 17, 2003, 2 pages, Advanced Slide Show Software.

"ProShow Producer New Features", Version 3.2, 3 pages, 2008, Photodex Corporation.

"Features in Detail", 2002-2007, 3 pages, CodeJam.

"Brand Your Slides with a Background or Watermark", 2008, 5 pages, Microsoft Corporation.

"International Search Report", Mailed Aug. 28, 2009, Application No. PCT/US2009/037228, Filed Date Mar. 16, 2009, 11 pages. (MS# 323098.02).

"Decision on Grant", Mailed date: Jun. 10, 2013, Russian Patent Application No. 2010142315/08, filed Mar. 16, 2009, 14 pages (MS# 323098.15).

"Offfice Action—Notice of Reason for Rejection", Mailed date: Mar. 25, 2013, Japanese Patent Application No. 2011-505060, filed Mar. 16, 2009, 7 pages (MS# 323098.11).

"Notice of Allowance", Mailed date: Jul. 12, 2013, Japanese Patent Application No. 2011-505060, filed Mar. 16, 2009, 7 pages (MS# 323098.11).

* cited by examiner

MULTI-LAYERED SLIDE TRANSITIONS

CROSS-REFERENCE TO RELATED APPLICATIONS

This application is a Continuation of pending patent application Ser. No. 12/104,422 entitled "MULTI-LAYERED SLIDE TRANSITIONS" and filed Apr. 16, 2008.

BACKGROUND

The ability to convey information in a meaningful and memorable way can be important for the presenter. Salespeople, for example, continually seek better ways to keep an audience alert and attentive to the information being presented such as via tricks, jokes, or other entertaining events such as viewer participation, etc.

Traditional slide transitions take away from the user experience by presenting slides as independent and atomic entities. Themes and styles assist users in establishing a uniform and cohesive presentation for more effective attention to the topics being presented. Many features that are designed to create immersion and cohesiveness within a presentation so users ensure that the slides have the same or similar background, styles show everything in the same or similar font, and the same color styles.

Transitions have traditionally been a feature of the presentation experience that viewers indicate break the continuity or flow of the presentation. The viewer sees one slide, and then another slide, and then perhaps a piece of animation. The viewer really does not know why but this stilted transition takes on more of an emphasis as to how two slides are different atomic entities. The viewer attention will move away due to the disruptive transition between two slides. This behavior falls in line with the notion that a global scheme should be made part of the whole slide presentation to smooth the viewer transition between slides and maintain viewer attention. Moreover, animation, music, and eye-catching graphics are just some of the ways in which the presenter seeks to catch and maintain viewer attention, yet the current transition technology continues to impact the viewer experience.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The architecture enhances the presentation experience of slide presentation, for example, by animating slide content as "actors" in the same background "scene". This is provided by multi-layered transitions between slides, where a slide is first separated into "layers" (e.g., with a level of transparency). Each layer can then be transitioned independently. All layers are composited together to accomplish the end effect.

The layers can comprise one or more content layers, and a background layer. The background layer can further be separated into a background graphics layer and a background fill layer. The transition phase can include a transition effect such as a fade, a wipe, a dissolve effect, and other desired effects. To provide continuity and uniformity of presentation, content can be presented on the same background scene and a transition effect not applied to the background layer.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

The disclosed slide transitioning architecture separates a slide into multiple content layers (e.g., title, content, background graphics, background fill, etc.), and independently transitions one or more of the slide layers. The architecture algorithmically converts any transition to a multi-layer transition. Transition effects such as fading the slide background fill, for example, provides a graceful visual smoothing between slides with different backgrounds.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives falling within the spirit and scope of the claimed subject matter.

Figure 1:
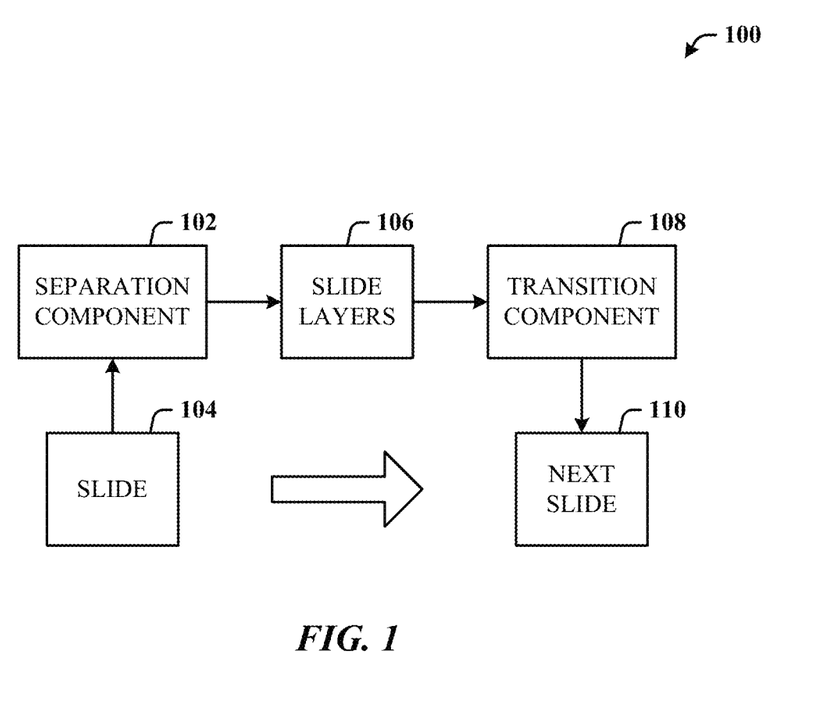
FIG. 1 illustrates a computer-implemented slide processing system.

FIG. 1 illustrates a computer-implemented slide processing system 100. The system 100 includes a separation component 102 for separating a slide 104 into slide layers 106, and a transition component 108 for transitioning the slide layers 106 from the slide 104 to a next slide 110.

The slide layers can be configured with a percentage of transparency to present a measure of transparency. The slide layers can include a slide content layer, slide title layer, and a slide background layer, each of which is transitioned independently of each other. The separated slide layers are eventually composited together to provide an animated effect on a common background scene.

The transition component 108 can apply a transition effect to one, some or all layers. For example, the transition component 108 can automatically apply a fade effect to a background of the slide 104 that is different than the background of the next slide 110 to provide a smooth visual transition from the slide 104 to the next slide 110. The transition component 108 also can automatically convert a static transition to a fluid transition.

Figure 2:
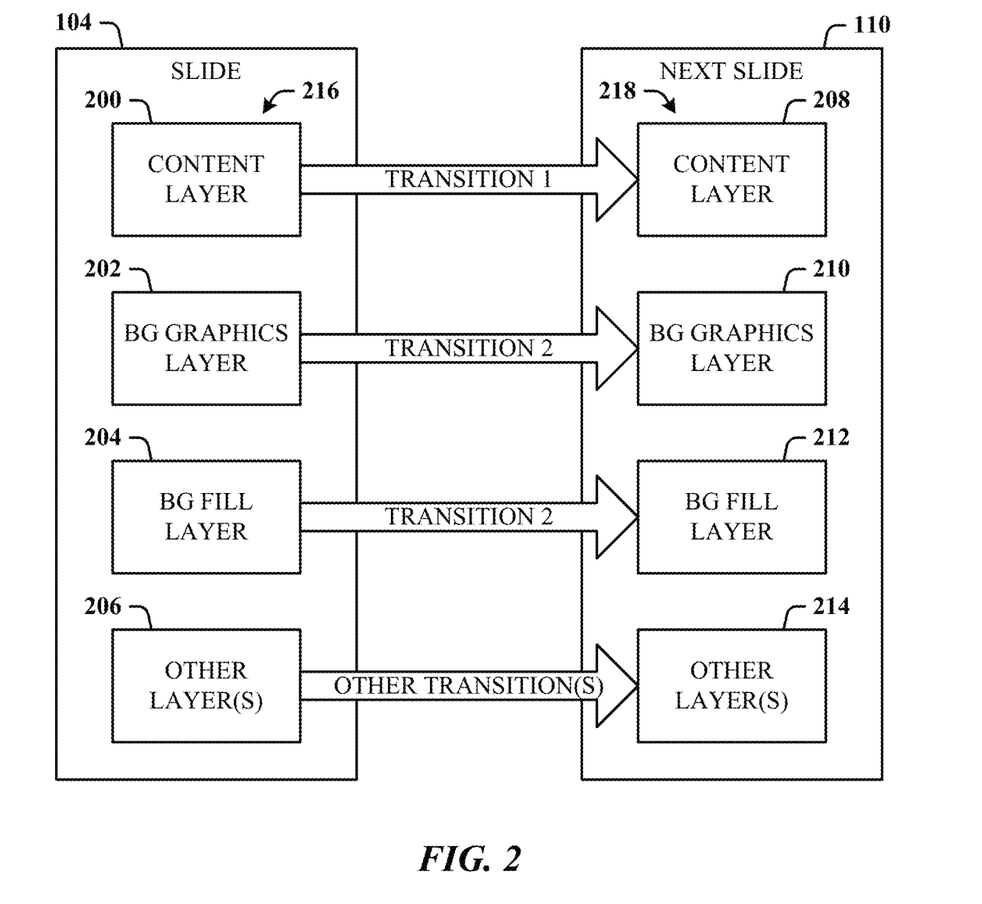
FIG. 2 illustrates exemplary layers that can be generated for transitioning between the slide and a next slide.

FIG. 2 illustrates exemplary layers that can be generated for transitioning between the slide 104 and a next slide 110. The separation component can process the slide 104 into a content layer 200, a background (BG) graphics layer 202, a background fill layer 204, and other layer(s) 206. The transition component then transitions each layer to the next slide 110 independently. In other words, the content layer 200 of the slide 104 is transitioned (Transition 1) to a content layer 208 of the next slide 110, the background graphics layer 202 of the slide 104 is transitioned (Transition 2) to a background graphics layer 210 of the next slide 110, the background fill layer 204 of the slide 104 is transitioned (Transition 3) to a background fill layer 212 of the next slide 110, and the other layer(s) 206 of the slide 104 can be transitioned (Other Transition(s)) to the other layer(s) 214 of the next slide 110. The other layer(s) 206 can include additional content layers such that text is a layer, images are on a different layer, charts are on a different layer, and so on.

Once the slide 104 has been separated into the individual layers 216, a separate transition effect can be applied to one, some or all of the layers 216. For example, a wipe transition effect can be applied to transition between the slide content layer 200 to the corresponding next slide content layer 208, while a dissolve transition effect can be applied to transition between the slide background graphics layer 202 to the corresponding next slide background graphics layer 210. In general, effects are not applied to the background layer(s) to maintain visual uniformity in a presentation.

The architecture algorithmically converts a static transition of a presentation into a fluid transition. In other words, the viewer can perceive a visual effect where the content flows (e.g., left to right, right to left, etc.) while viewing the flowing content through a single slide. Moreover, the multi-layer transition makes the layers appear as a 3D (three dimensional) presentation with depth in the layers.

The basic multi-layer transition can comprise two layers: slide content and slide background. Users can easily convert any traditional transitions by applying the existing transition only to the slide content layer. Thus, the slide background layer remains static and maintains uniformity for all content of the various slides.

To maintain visual uniformity, multi-layer transitions are best used on slides with similar backgrounds. In one embodiment, a simple and effective way of handling slides with different backgrounds is to apply a fade transition effect to the background layer. For slides with the same background, fading between the same images creates no visual change. The use of images to achieve the desired results is described below. For slides with different backgrounds, fade is a graceful and gradual change.

It is not a requirement that the number of layers 216 in the slide 104 be the same as the number of layers 218 in the next slide 110. In one implementation, the same number of layers is created for all slides in a slide deck. This can be performed globally based on the first slide, for example. Where a layer does not exist on a slide, a pseudo layer can be created, or the layer mismatch can simply be ignored. In an alternative implementation, the number of layers from slide to slide can vary. In this latter case, a transition from one layer to a non-existent layer, is ignored.

Figure 3:
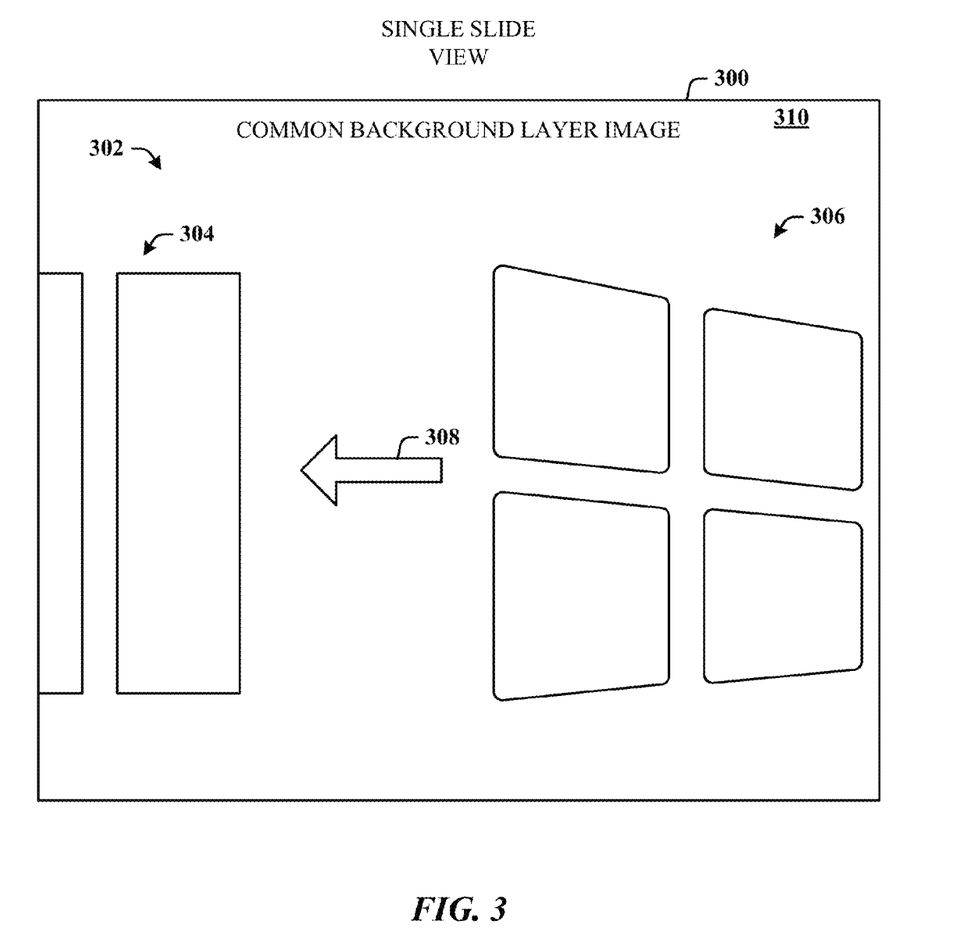
FIG. 3 illustrates a multi-layer transition in a single slide view with animated presentation.

FIG. 3 illustrates a multi-layer transition in a single slide view 300 with animated presentation. The multi-layer transition shows a content layer and a background layer. At this particular moment in the animated presentation, two sets of content 302 are shown transitioning through the content layer: a first set of content 304 and a second set of content 306. A direction of animated movement is represented by the arrow 308 as the content moves right to left against a common background layer 310. In other words, the background layer graphic does not change as the sets of content 302 move through the single slide view. Subsequent slides are processed and the associated slide content appears on the right following the second set of content 306, and then moves right to left and disappears, as the first set of content 304 shows disappearing off the left side of the slide view 300.

Figure 4:
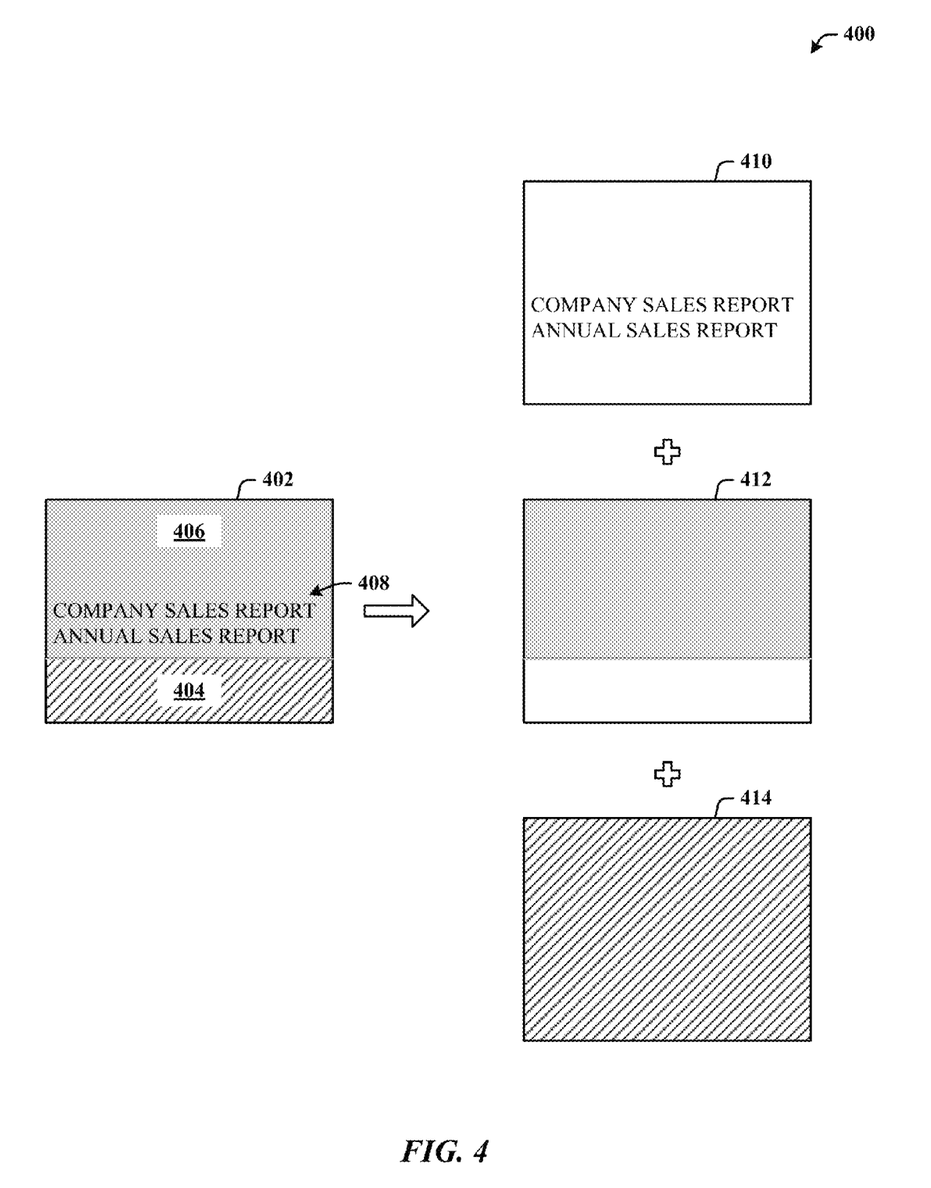
FIG. 4 illustrates an exemplary separation process for a static slide.

FIG. 4 illustrates an exemplary separation process 400 for a static slide 402. Here, the static slide 402 shows a background 404, a first content 406, and a second content 408. As previously described, slides can be separated into a background layer (the scene) and one or more content layers (also referred to as the actors). The separation process involves create an image of the slide background, querying the slide 402 for all content, and creating images for each desired content layer. A slide-sized transparent image is created and the desired content is added as images to transparent layer. Here, the static slide 402 is separated into a first content layer 410, a second content layer 412 and a background layer 414. Note that the white space in the content layers (410 and 412) represents transparent regions. It is noted that a layer does not need to be the entire size of the slide, such as shown for the second content layer 412, for example.

Figure 5:
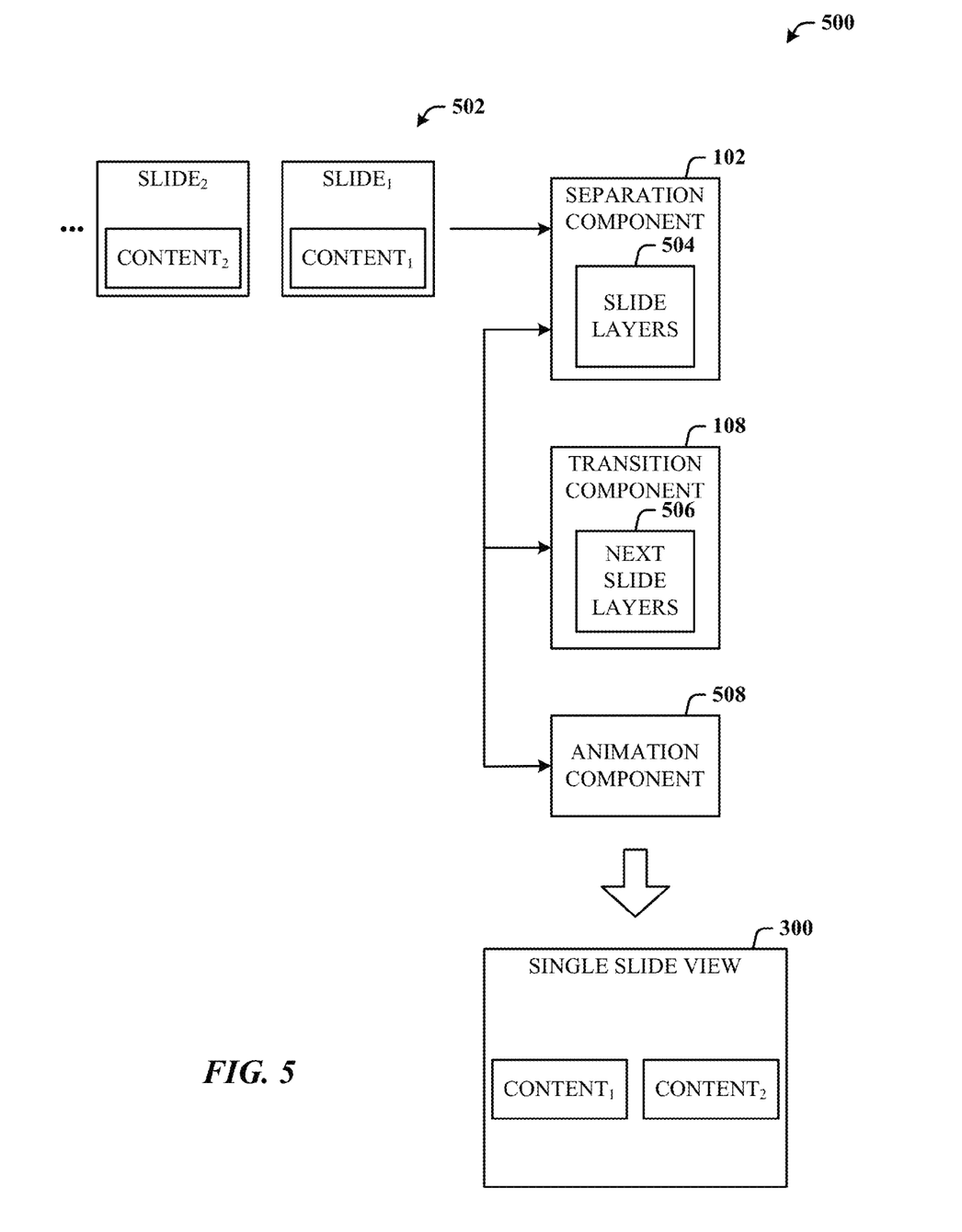
FIG. 5 illustrates a multi-layer transition slide processing system that employs animation.

FIG. 5 illustrates a multi-layer transition slide processing system 500 that employs animation. The system 500 includes the separation component 102 for separating slides 502 into slide layers 504, the transition component 108 for transitioning the slide layers 504 independently from each of the slides 502 to next slide layers 506 of the next slides.

The system 500 further comprises an animation component 508 for providing animation to one or more of the slide layers 504 over a background scene layer. The slide layers 504 can include a content layer, a fill layer, and a background layer, with the animation applied to the content layer, for example. The transition component 108 applies a transition effect (e.g., fade) to a content layer that converts a static transition from the slide to a fluid transition. The slide view 300 can present the transitions of the contents (e.g., Content$_1$, Content$_2$, etc.) of the slides 502 as fluid animated motion.

The system 500 can also automatically apply different graphical properties per layer in a systematic or programmatic way. For example, a depth property can be applied to each layer via an algorithm. Additionally, multiple slides can use the same transition. Consider a slide deck of ten slides and a majority of the ten slides use the same or similar background. The system 500 (as well as the system 100) can automatically select the background employed in the majority of the slides for use in the entire slide deck. Similarly, a foreground layer can be created that is composed of the foreground on all ten slides. Transitioning can then be performed between these slides simultaneously.

From a viewer perspective, the "camera" pulls back to reveal some or all of the slide deck laid out in some format. The camera allows the user to then zoom in on each slide for a closer look, and then zoom out for the more global view. Thus, a layer system is provided for applying one or more of same uniformities that exist in the slide deck and all the benefits of multi-layer transition architecture by maintaining the same background during that camera zoom-out and the camera zoom-in. In other words, if the presentation includes different themes, the viewer is not presented with different themes but a single theme.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
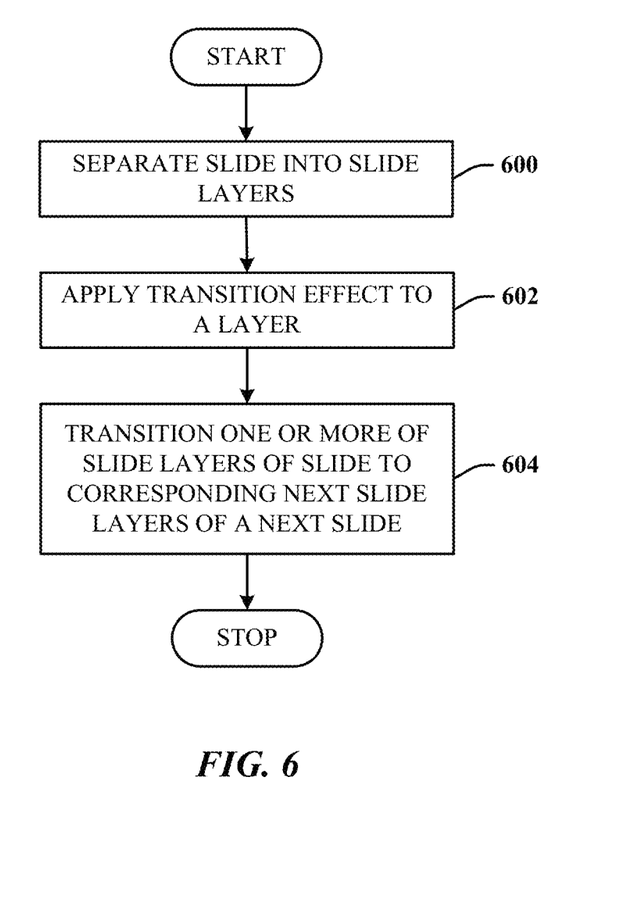
FIG. 6 illustrates a method of processing slides.

FIG. 6 illustrates a method of processing slides. At 600, a slide is separated into slide layers. At 602, a transition effect is applied to a layer. At 604, one or more of the slide layers of the slide are transitioned to corresponding next slide layers of a next slide.

Figure 7:
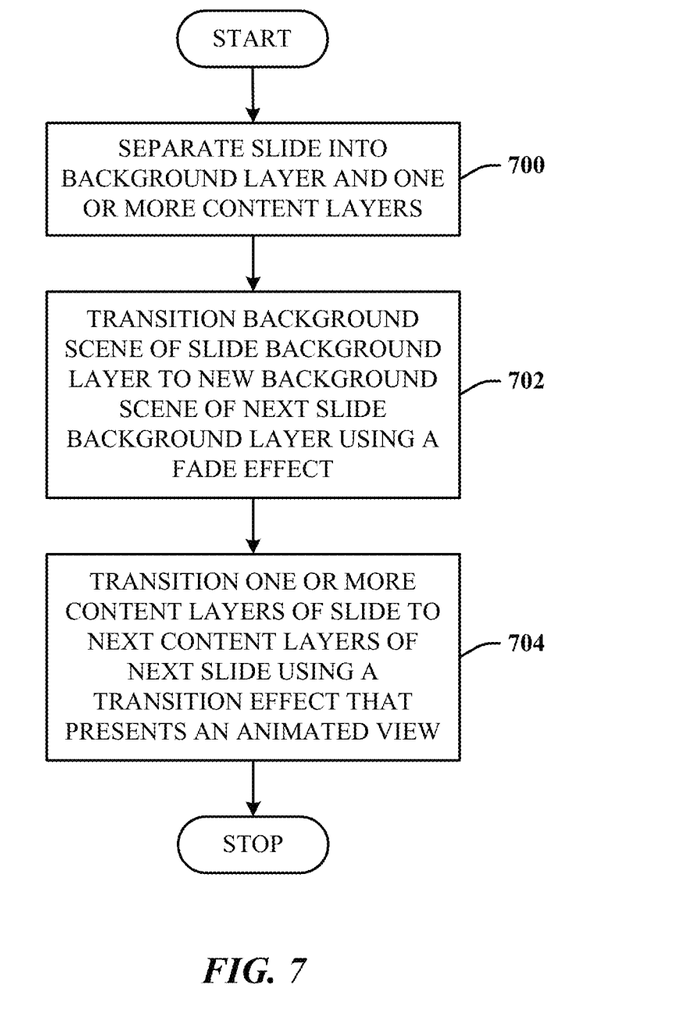
FIG. 7 illustrates a method of separating a slide into layers.

FIG. 7 illustrates a method of separating a slide into layers. At 700, a slide is separated into a background layer and one or more content layers. At 702, a background scene of the slide background layer is transitioned to a new background scene of the next slide background layer using a fade effect. At 704, one or more of the content layers of the slide are transitioned to next content layers of a next slide using a transition effect that presents an animated view.

Figure 8:
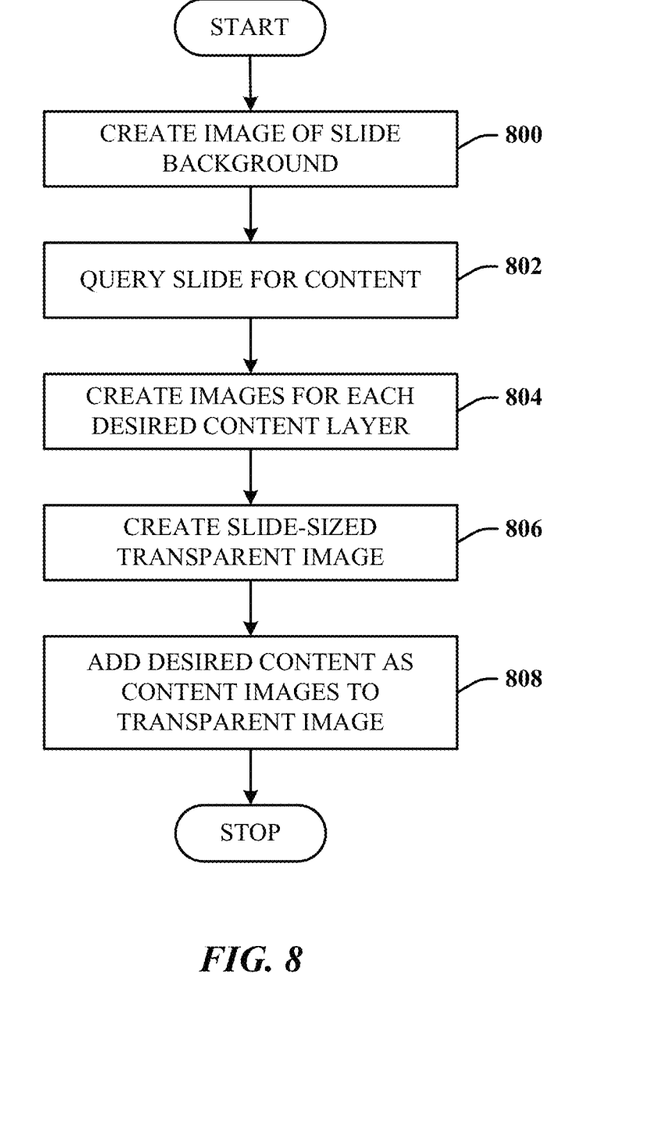
FIG. 8 illustrates a method of separating a slide using images.

FIG. 8 illustrates a method of separating a slide using images. At 800, an image is created of a slide background. At 802, the slide is queried for content. At 804, images are created for each of the desired content layer. At 806, a slide-sized transparent image is created. At 808, the desired content is added as content images to the transparent image.

Other aspects can include applying a transition effect to each of the slide layers and transitioning each of the slide layers independently, algorithmically converting the transition effect to a multi-layer transition effect that presents an animated flow in a single slide view, and applying different transition effects to correspondingly different slide layers for transitioning of the slide layers.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
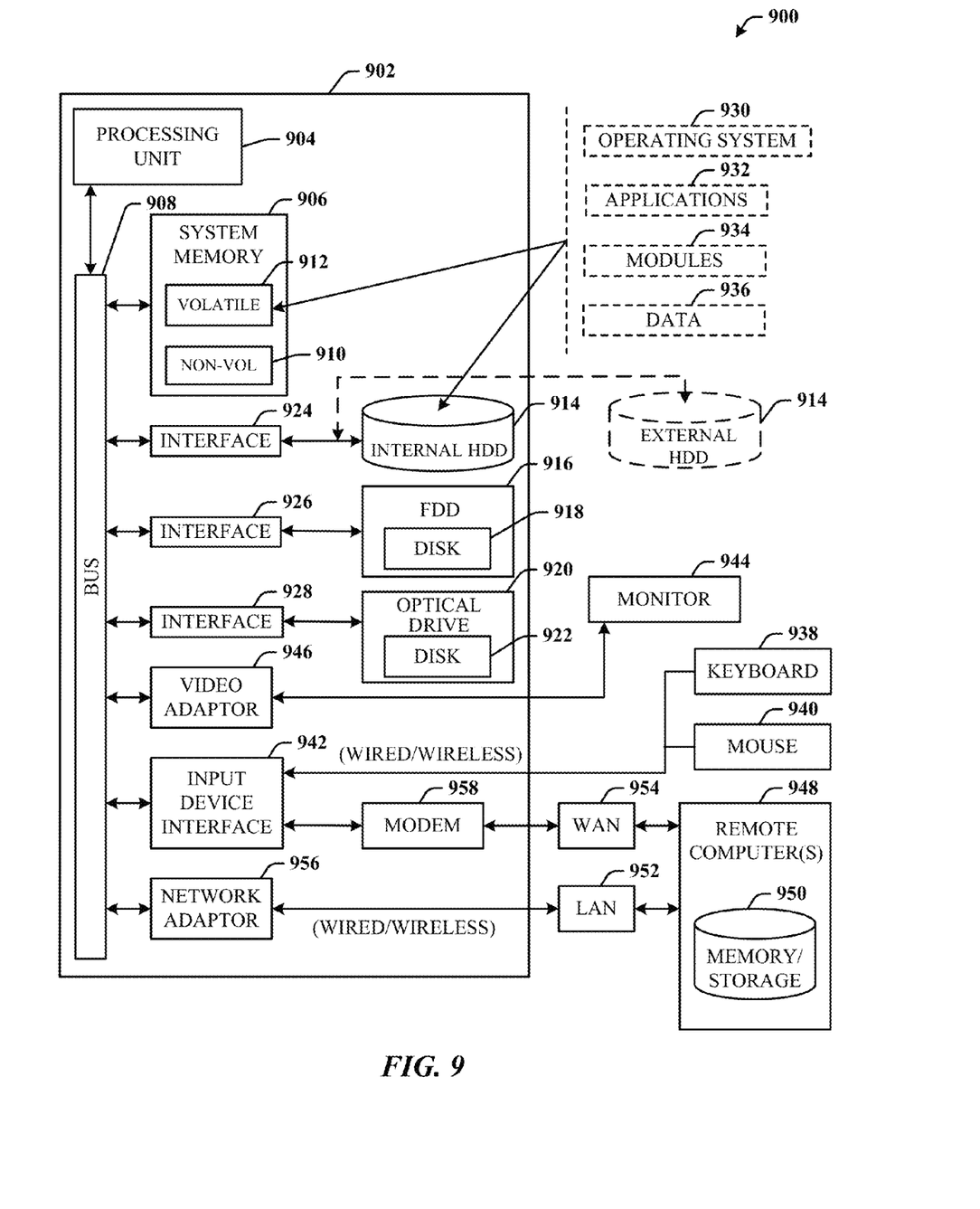
FIG. 9 illustrates a block diagram of a computing system operable to execute multi-layered slide transitions in accordance with the disclosed architecture.

Referring now to FIG. 9, there is illustrated a block diagram of a computing system 900 operable to execute multi-layered slide transitions in accordance with the disclosed architecture. In order to provide additional context for various aspects thereof, FIG. 9 and the following discussion are intended to provide a brief, general description of a suitable computing system 900 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902 having a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 can include non-volatile memory (NON-VOL) 910 and/or volatile memory 912 (e.g., random access memory (RAM)). A basic input/output system (BIOS) can be stored in the non-volatile memory 910 (e.g., ROM, EPROM, EEPROM, etc.), which BIOS are the basic routines that help to transfer information between elements within the computer 902, such as during start-up. The volatile memory 912 can also include a high-speed RAM such as static RAM for caching data.

The computer 902 further includes an internal hard disk drive (HDD) 914 (e.g., EIDE, SATA), which internal HDD 914 may also be configured for external use in a suitable chassis, a magnetic floppy disk drive (FDD) 916, (e.g., to read from or write to a removable diskette 918) and an optical disk drive 920, (e.g., reading a CD-ROM disk 922 or, to read from or write to other high capacity optical media such as a DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 912, including an operating system 930, one or more application programs 932, other program modules 934, and program data 936. The one or more application programs 932, other program modules 934, and program data 936 can include the separation component 102, the slide 104, the slide layers 106, the transition component 108, the next slide 110, the layers 216 that transition to the layers of the next slide 110, the single view 300, two sets of content 302, the common background layer 310, the separation process 400, the system 500 and entities such as the slides 502, slide layers 504, next slide layers 506, and animation component 508, for example.

All or portions of the operating system, applications, modules, and/or data can also be cached in the volatile memory 912. It is to be appreciated that the disclosed architecture can be implemented with various commercially available operating systems or combinations of operating systems.

A user can enter commands and information into the computer 902 through one or more wire/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, etc.

A monitor 944 or other type of display device is also connected to the system bus 908 via an interface, such as a video adaptor 946. In addition to the monitor 944, a computer typically includes other peripheral output devices (not shown), such as speakers, printers, etc.

The computer 902 may operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, is connected to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented slide processing system, comprising:
 a transition component that performs:
  displaying a first content within a first layer of a first slide;
  displaying a second content within a second layer of the first slide;

receiving a first transition effect for the first content;
receiving a second transition effect for the second content, the second transition effect different than the first transition effect; and
during a transition phase from the first slide to a next slide:
applying the first transition effect to the first content within the first layer; and
applying the second transition effect to the second content within the second layer; and
a processor configured to execute computer-executable instructions associated with the transition component.

2. The system of claim 1, wherein the first layer is at a different depth than the second layer.

3. The system of claim 1, wherein the first transition effect comprises display of animated motion of the first content.

4. The system of claim 1, wherein the second transition effect comprises display of a fade effect, a wipe effect, or a dissolve effect.

5. The system of claim 1, wherein the first content includes any one of an image, text, or a chart.

6. The system of claim 1, wherein the first content is a different size than the second content.

7. The system of claim 1, the transition component further comprising retaining a common background graphic as the first content and the second content move through a single slide view.

8. The system of claim 1, the transition component further comprising enabling zoom in and zoom out of some slides or all slides of a slide deck.

9. The system of claim 1, the transition component further comprising automatically selecting a background based on a majority of slides that use the background.

10. A computer-implemented method of processing slides, the method comprising acts of:
displaying a first content within a first layer of a first slide and a second content within a second layer of the first slide;
receiving a first transition effect for the first content and a second transition effect for the second content, the second transition effect different than the first transition effect;
executing a transition phase from the first slide to a next slide that applies the first transition effect to the first content within the first layer, and that applies the second transition effect to the second content within the second layer; and
configuring a processor to execute computer-executable instructions associated with at least one of the acts of displaying, receiving, or executing.

11. The method of claim 10, further comprising displaying the first layer at a depth different than the second layer.

12. The method of claim 10, further comprising displaying, as part of the first transition, an animated motion of the first content.

13. The method of claim 10, further comprising displaying, as part of the second transition, a fade effect, a wipe effect, or a dissolve effect.

14. The method of claim 10, further comprising retaining a common background graphic as the first content and the second content move through a single slide view.

15. The method of claim 10, further comprising enabling zoom in and zoom out of some slides or all slides of a slide deck.

16. The method of claim 10, further comprising automatically selecting a background based on a majority of slides that use the background.

17. A physical computer-readable medium containing program instructions that cause a computer processor to perform a method, the method comprising acts of:
displaying a first content within a first layer of a first slide and a second content within a second layer of the first slide;
displaying an animated motion of the first content;
receiving a first transition effect for the first content and a second transition effect for the second content, the second transition effect different than the first transition effect;
executing a transition phase from the first slide to a next slide that applies the first transition effect to the first content within the first layer, and that applies the second transition effect to the second content within the second layer; and
configuring a processor to execute computer-executable instructions associated with at least one of the acts of displaying, receiving, or executing.

18. The computer-readable medium of claim 17, the method further comprising an act of automatically selecting a background based on a majority of slides that use the background.

19. The computer-readable medium of claim 17, the method further comprising an act of retaining a common background graphic as the first content and the second content move through a single slide view.

20. The computer-readable medium of claim 17, the method further comprising at least one of the acts of:
displaying, as part of the first transition, an animated motion of the first content; or
displaying, as part of the second transition, a fade effect, a wipe effect, or a dissolve effect.

* * * * *